April 11, 1967  L. J. EVANS  3,313,165
ROTARY MOUNT AND DRIVE MEANS FOR A DISPLAY SIGN
Filed April 5, 1965  2 Sheets-Sheet 1

INVENTOR.
Louis J. Evans
BY
Webster & Webster
Attorneys

United States Patent Office 3,313,165
Patented Apr. 11, 1967

3,313,165
ROTARY MOUNT AND DRIVE MEANS FOR A DISPLAY SIGN
Louis J. Evans, Oakland, Calif., assignor to American Neon Displays, Inc., Oakland, Calif., a corporation of California
Filed Apr. 5, 1965, Ser. No. 445,625
9 Claims. (Cl. 74—206)

This invention is directed to, and it is a major object to provide, a novel power driven rotary mount; the mount being especially designed, but not limited, for use to support and revolve a display sign.

Another important object of the invention is to provide a rotary mount, as above, adapted to be carried on a fixed column or post and embodying a novel drive mechanism between such a post and a driven ring included in said rotary mount.

An additional important object of the invention is to provide a novel drive mechanism, as in the preceding paragraph, which—in cooperation with the driven ring—serves to center and stabilize the rotary mount relative to the post. By virtue of such centering and stabilizing of the rotary mount, racking thereof (including any supported sign) due to wind is effectively prevented.

It is also an object of the invention to provide a novel drive mechanism, for the purpose described, which is of friction-type and self-adjusting for normal wear; the mechanism including a novel assembly of driven, vertically spring-pressed friction rollers running against the inner and inclined face of a ring in the form of a shallow frustum.

A further object of the invention is to provide a rotary mount which is designed for ease and economy of manufacture.

A still further object of the invention is to provide a practical, reliable, and durable rotary mount and one which is exceedingly effective for the purpose for which it is designed.

These objects are accomplished by means of such structure and relative arrangement of parts as will fully appear by a perusal of the following specification and claims.

Figure 1:
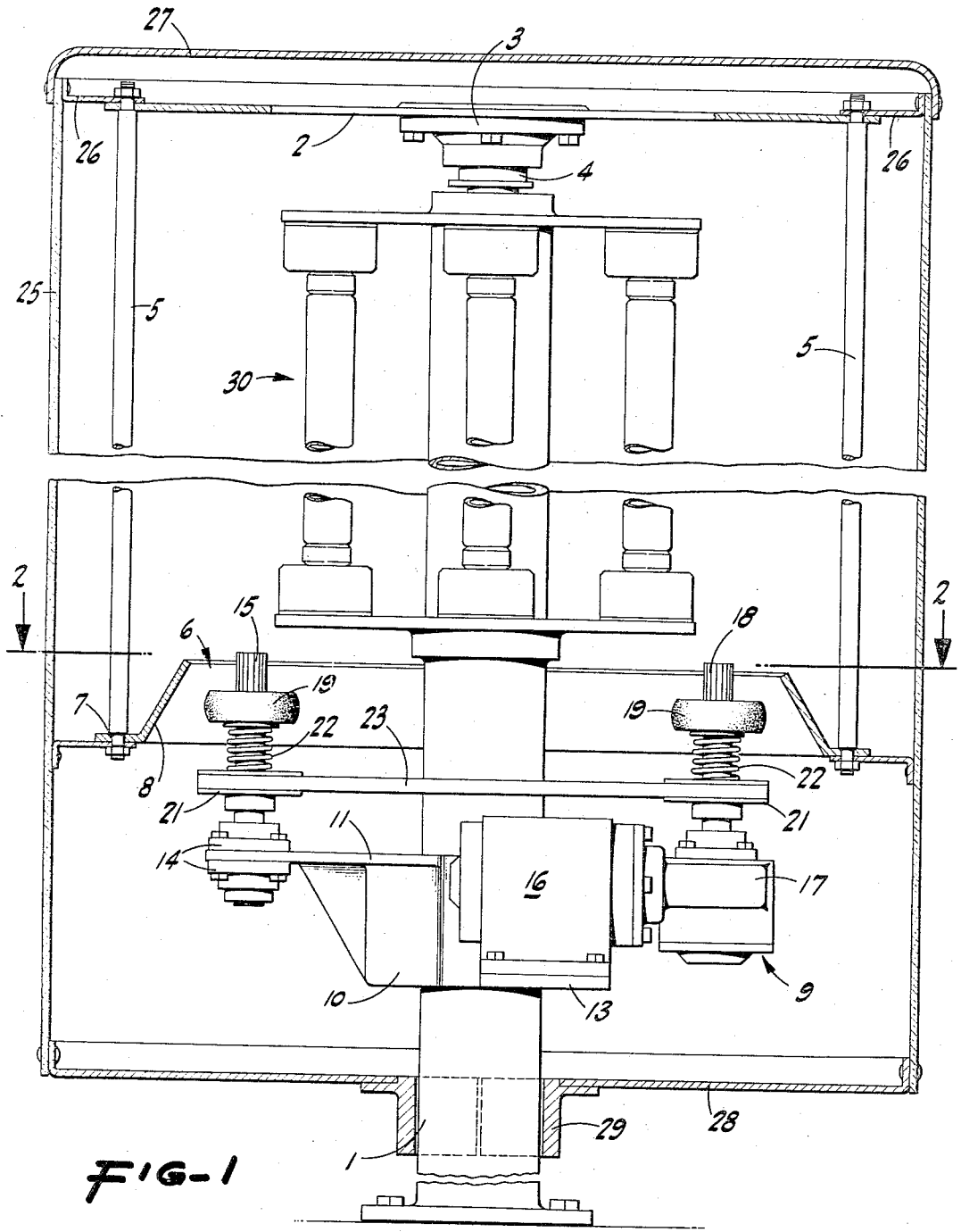
FIG. 1 is an elevation of the rotary mount; the view being foreshortened and partly in section.
Figure 2:
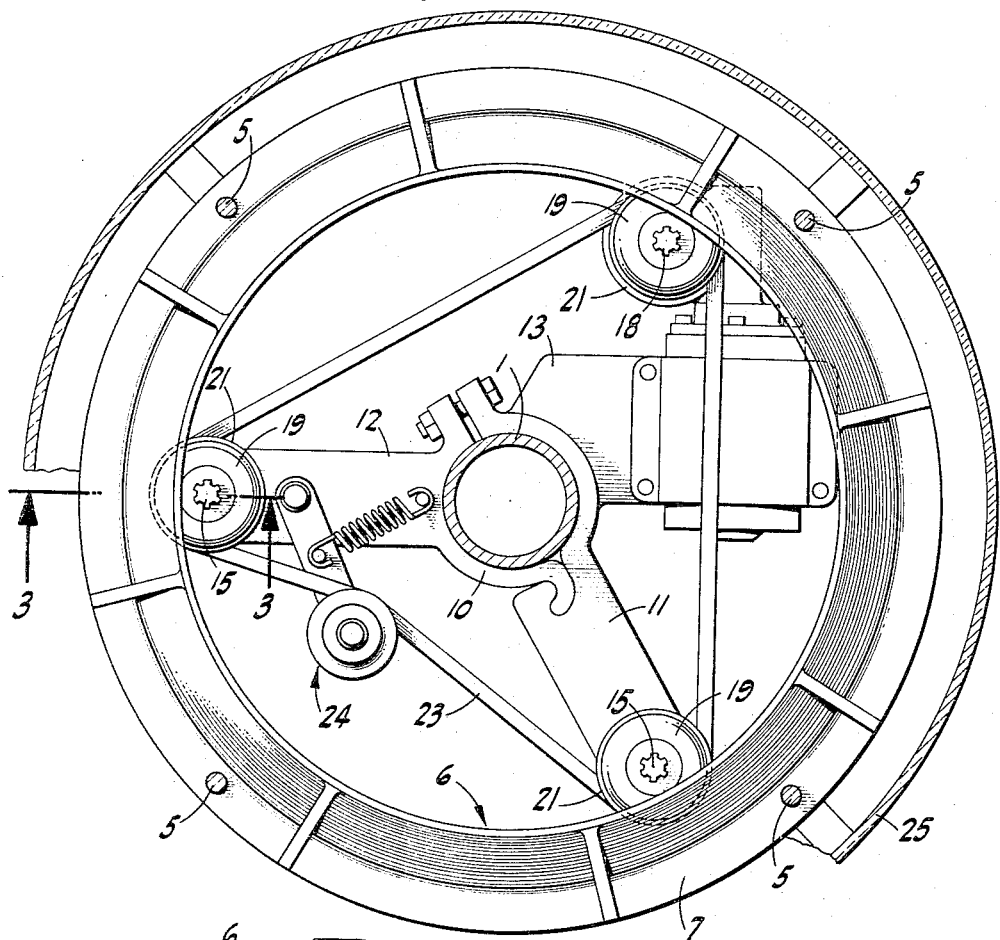
FIG. 2 is a sectional plan view on substantially line 2—2 of FIG. 1.
Figure 3:
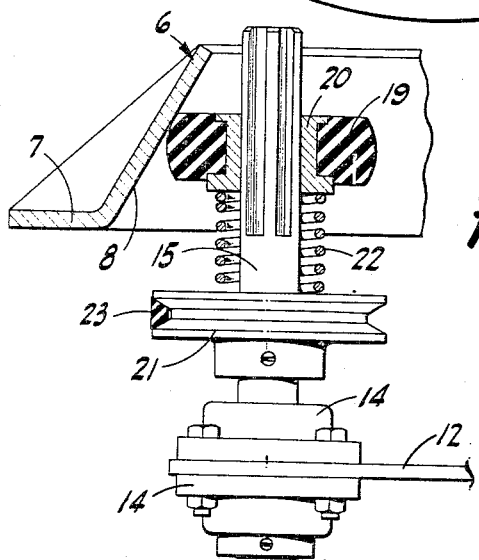
FIG. 3 is an enlarged fragmentary sectional elevation on substantially line 3—3 of FIG. 2.

Referring now more particularly to the drawings and to the characters of reference marked thereon, the rotary mount comprises—in connection with a vertical column or post 1—a horizontal top plate 2 preferably in the form of a spider; such top plate 2 being centrally attached to the rotary head 3 of a thrust bearing 4 mounted on the upper end of such post.

A plurality of suspension rods 5 are secured to and depend from the top plate 2 in circumferentially spaced relation about the post 1 and equidistantly spaced therefrom in a radial direction.

A ring 6 surrounds the post 1 a substantial distance below the thrust bearing 4 and adjacent the lower ends of the suspension rods 5; the latter being secured at said lower ends to a radially outwardly extending annular flange 7 on the lower edge of said ring 6.

The ring 6 is of shallow, frusto-conical form whereby to provide an inner face 8 which extends at an upward and inward incline.

The rotary mount includes, on the post 1, a ring-centering and driving mechanism, indicated generally at 9, and which mechanism comprises the following:

A clamp-type sleeve 10 surrounds, and is vertically adjustably secured to, the post 1 in a horizontal plane below the ring 6; such sleeve including circumferentially spaced, outwardly projecting arms, indicated at 11, 12, and 13.

The arms 11 and 12 are each fitted at the outer end with a bearing 14 in which upstanding spindles 15 are journaled at their lower ends.

The arm 13, which is in a somewhat lower horizontal plane than the arms 11 and 12, supports an electric, gear-head motor 16 and wherein the gear-head is indicated at 17. The output shaft of the gear-head 17 comprises another upstanding spindle 18 corresponding to the spindles 15 and occupying the same horizontal plane. The two spindles 15 and the other spindle 18 are disposed within the confines of the ring 6 in symmetrically spaced relation circumferentially thereof and with equal spacing radially inwardly therefrom; each such spindle being fitted at the upper portion with a friction drive roller 19 of rubber or similar material. Such rollers each have a metallic hub 20 vertically slidably splined (as shown) on the corresponding spindle.

Some distance below the related friction drive roller 19, each of the two spindles 15 and said spindle 18 is fitted with a pulley 21; there being a compression spring 22 surrounding each such spindle between the friction drive roller 19 and pulley 21.

The sleeve 10 is initially adjusted on the post 1 so that the friction drive rollers 19 bear firmly against the inclined face 8 of the ring 6, and with the compression springs 22 then under some load whereby to constantly urge said rollers upwardly. As a result, the friction drive rollers 19 are maintained in proper driving relation to the ring 6, while at the same time maintaining such ring in concentric relation to the post 1. Further such spring urging of the rollers compensates for normal wear of the latter.

An endless belt 23 spans between and is trained about the pulleys 21, and such belt is maintained under proper tension by a spring-urged belt tightener, indicated generally at 24, mounted on the arm 12 and cooperating with the adjacent reach of such belt.

The endless belt 23 is driven from the pulley 21 on the spindle 18 upstanding from the gear-head 17; the belt 23, as so driven, producing rotation of the spindles 15, simultaneously with the spindle 18, through the medium of the related pulleys 21.

With all of the spindles and friction drive rollers thus simultaneously driven and at the same speed, an effective frictional drive is imparted from such rollers to the engaged ring 6 whereby tthe assembly—comprised of top plate 2, suspension rods 5, and said ring 6—is revolved as a unit and with the ring centered about the post 1.

The above described rotary mount is particularly intended to support and revolve a display sign which—by way of example—may constitute a cylindrical sign body 25 disposed about the rotary mount concentric to the post 1; the sign body 25 being secured to such mount by standoff ears 26 connected to the ends of the suspension rods 5. Also, the sign may include a cover 27, and a bottom 28 having a collar 29 turnable about the said post 1. If the sign is of internally illuminated type, the sign body 25 may be translucent and a light unit 30 of fluorescent or other suitable type is mounted on the post 1 within the confines of the described rotary mount and above the drive mechanism 9.

By virtue of the circumferentially spaced friction drive rollers 19 always being in engagement with the face 8 of ring 6, not only is the latter centered relative to the post 1 but, additionally, the entire rotary mount (and the sign carried thereby) cannot rack from side to side due to wind pressure when the structure is employed outdoors. Also, such prevention of lateral racking is of advantage in preventing damage during shipment of the rotary mount.

Another advantage of the described ring-centering and drive mechanism 9 resides in the fact that if the friction drive rollers 19 wear abnormally and beyond the limit of upward movement imparted thereto by the compression springs 22, the entire mechanism 9 can be adjusted upwardly on the post 1 to compensate for such wear. This is possible by reason of the inclusion of the clamp-type sleeve 10. Upon such upward adjustment of the mechanism 9, the friction drive rollers 19 are again brought into proper contact with the face 8 of ring 6, and with the compression springs 22 again under load.

From the foregoing description, it will be readily seen that there has been produced such a rotary mount as substantially fulfills the objects of the invention, as set forth herein.

While this specification sets forth in detail the present and preferred construction of the rotary mount, still in practice such deviations from such detail may be resorted to as do not form a departure from the spirit of the invention, as defined by the appended claims.

Having thus described the invention, the following is claimed as new and useful and upon which Letters Patent is desired:

1. A power driven rotary mount comprising a post, a top member turnably secured to the post, a ring surrounding the post a distance below the top member, suspension elements between the top member and the ring, and a drive mechanism on the post engaging the ring; the ring being of shallow frusto-conical form whereby to provide an upwardly and inwardly inclined inner face; the drive mechanism including friction rollers engaging such face, and one at least of the rollers being driven.

2. A rotary mount, as in claim 1, in which the rollers are circumferentially spaced, vertically movable, and spring urged upwardly whereby to center said ring relative to the post.

3. A rotary mount, as in claim 2, including a spindle corresponding to each roller and on which spindle such roller is splined for vertical sliding movement, and a compression spring on each spindle below and urging the related roller upwardly; there being a supporting structure on which the drive mechanism is mounted and including bearings in which the spindles are journaled.

4. A power driven rotary mount comprising, a post, a top member turnably secured to the post, a ring surrounding the post a distance below the top member, suspension elements between the top member and the ring, the latter being of shallow frusto-conical form to provide an upwardly and inwardly inclined inner face, a plurality of vertical axis friction rollers supported in circumferentially spaced relation from the post within the confines of the ring and in engagement with such face, each roller having a driving spindle, means for supporting the spindles from the post, a pulley on each spindle, an endless belt trained about and running between the pulleys, and drive means for one of such spindles.

5. A rotary mount, as in claim 4, in which the spindle-supporting means includes a sleeve secured on the post, rigid arms extending outwardly from the sleeve in circumferentially spaced relation about the post, and means journaling the spindles in connection with corresponding arms.

6. A rotary mount, as in claim 5, in which one such means is an electric gear-head motor.

7. A power driven rotary mount comprising, a post, a top member turnably secured to the post, a ring surrounding the post a distance below the top member, suspension elements between the top member and the ring, the latter being of shallow frusto-conical form to provide an upwardly and inwardly inclined inner face, a plurality of vertical axis friction rollers supported in circumferentially spaced relation from the post within the confines of the ring and in engagement with such face, each roller having a driving spindle on which the roller is splined for vertical sliding movement, means for supporting the spindles from the post, a compression spring on each spindle below and urging the related roller upwardly, a pulley on each spindle below the related roller and spring and supporting the latter, an endless belt trained about and running between the puleys, and drive means for one of such spindles.

8. A power driven rotary mount comprising, a post, a top member turnably secured to the post, a ring surrounding the post a distance below the top member, suspension elements between the top member and the ring, the latter being of shallow frusto-conical form to provide an upwardly and inwardly inclined inner face, a plurality of vertical axis friction rollers supported in circumferentially spaced relation from the post within the confines of the ring and in engagement with such face, each roller having a driving spindle on which the roller is splined for vertical sliding movement, a compression spring on each spindle below and urging the related roller upwardly, a pulley on each spindle below the related roller and spring and supporting the latter, an endless belt trained about and running between the pulleys, and drive means for one of such spindles; there being a sleeve fixed on the post, a plurality of circumferentially spaced arms extending outwardly from the sleeve, and means journaling the spindles in connection with corresponding arms, one such means comprising said drive means and being an electric gear-head motor.

9. A power driven rotary mount comprising, a post, a top member turnably secured to the post, a ring surrounding the post a distance below the top member, suspension elements between the top member and the ring, the latter being of shallow frusto-conical form to provide an upwardly and inwardly inclined inner face, a plurality of circumferentially spaced friction rollers engaging said face, a drive mechanism for the rollers including an electric motor, and a structure mounting the rollers and motor in connection with the post for vertical adjustment as a unit thereon.

References Cited by the Examiner

UNITED STATES PATENTS

| 1,928,333 | 9/1933 | Eaton | 40—33 |
| 2,075,245 | 3/1937 | Van Schuck | 40—33 |

DAVID J. WILLIAMOWSKY, *Primary Examiner.*

L. H. GERIN, *Assistant Examiner.*